United States Patent Office 3,271,438
Patented Sept. 6, 1966

3,271,438
PRODUCTION OF POLYCYCLIC COMPOUNDS
Lawrence G. Cannell, Lafayette, Calif., assignor to Shell Oil Company, New York, N.Y., a corporation of Delaware
No Drawing. Filed May 14, 1964, Ser. No. 367,549
11 Claims. (Cl. 260—464)

This invention relates to an improved method for the production of certain polycyclic organic compounds. More particularly it relates to the production of substituted quadricyclo(2.2.1.2$^{3,5}$.0$^{2,6}$)nonanes.

The general class of substituted quadricyclo-(2.2.1.2$^{3,5}$.0$^{2,6}$)nonanes is known in the art, being produced by condensation of bicyclo(2.2.1)hepta-2,5-dienes with certain reactive ethylenic compounds. The production of these quadricyclononanes is described by Schrauzer, Chem. Ber. 95, 2764 (1962), who condensed bicyclo-(2.2.1)hepta-2,5-diene with acrylonitrile and ethyl acrylate in the presence of certain nickel catalysts, i.e., bis(acrylonitrile)nickel and triphenylphosphine nickel tricarbonyl. While the above-mentioned ethylenic compounds did condense with the bicycloheptadiene to produce 8-substituted quadricyclo(2.2.1.2$^{3,5}$.0$^{2,6}$)nonanes, other closely related materials, e.g., methyl vinyl ketone, did not yield any substantial amount of the desired compound. If would therefore appear that the reaction described by Schrauzer is not general, at least in the presence of the catalysts he employed. It would be of advantage to provide a catalyst for the condensation of reactive ethylenic compounds with bicycloheptadienes that would provide greater applicability for the condensation process.

It is an object of the present invention to provide an improved process for the production of substituted quadricyclo(2.2.1.2$^{3,5}$.0$^{2,6}$)nonanes. A more particular object is to provide a process for the condensation of bicyclo-(2.2.1)hepta-2,5-dienes with activated ethylenically unsaturated compounds in the presence of certain nickel(0) complexes as catalyst.

It has now been found that these objects are accomplished by the process of reacting bicyclo(2.2.1)hepta-2,5-dienes with ethylenic compounds having an electron withdrawing group as a substituent on one carbon atom of the carbon-carbon double bond in the presence of tetrakisphosphite nickel complexes as catalyst.

The catalysts that have been found to be suitable in the process of the invention are nickel catalysts wherein the nickel is in a reduced oxidation state, preferably the zero oxidation state, and is stabilized by complex formation with stabilizing tertiary phosphite ligands. The phosphite ligands appear to be capable of donating an electron pair to the metal to form a coordinate bond and to simultaneously have the ability to accept electrons from the metal, thereby imparting stability to the resulting complex. Best results are obtained when the phosphite catalyst is a tetrakis(trihydrocarbylphosphite)nickel(0) complex wherein the hydrocarbyls independently have from 1 to 10 carbon atoms. One class of such compounds is represented by the formula [P(OR)$_3$]$_4$Ni(0) wherein R independently is hydrocarbyl free from non-aromatic unsaturation, e.g., alkyl, cycloalkyl or aryl, having from 1 to 10 carbon atoms, preferably from 1 to 7, as illustrated by alkyl R groups such as methyl, ethyl, propyl, sec-butyl, isopropyl, isoamyl, 2-ethylhexyl, octyl, nonyl, decyl, benzyl and β-phenylethyl; cycloalkyl groups such as cyclopentyl, cyclohexyl, 3-ethylcyclopentyl and 2,4-dimethylcyclohexyl; and aryl groups such as phenyl, toltyl, xylyl, p-ethylphenyl and m-tert-butylphenyl.

Exemplary tetrakis(trihydrocarbylphosphite)nickel(0) catalysts include tetrakis(tributylphosphite)nickel(0),
tetrakis(triphenylphosphite)nickel(0),
tetrakis[tri(p-tolyl)phosphite]nickel(0),
tetrakis(trimethylphosphite)nickel(0),
tetrakis(triisopropylphosphite)nickel(0),
bis(tritolylphosphite)bis(trihexylphosphite)nickel(0),
tetrakis(amyldibutylphosphite)nickel(0),
tetrakis(dibenzylphenylphosphite)nickel(0)

and the like. In general, tetrakis(trialkylphosphite)nickel(0) catalysts are preferred over the corresponding complexes wherein the hydrocarbyl substituents of the phosphite ligands are cycloalkyl or aryl, and particularly useful as catalyst is tetrakis[tri(2-ethylhexyl)-phosphite]-nickel(0).

The nickel complex catalysts are conveniently prepared by any of several methods, e.g., according to the disclosure of U.S. 3,102,899, issued September 3, 1963, to Cannel, or the disclosure of co-pending application of Mullineaux Serial No. 275,517, filed April 25, 1963.

The nickel(0) complex catalysts are preferably employed as preformed materials, but alternatively may be prepared in situ as by the reaction of a nickel(I) or nickel(II) compound with a suitable reducing agent in the presence of the desired trihydrocarbylphosphite ligand.

The bicycloheptadiene reactant is a substituted or unsubstituted bicyclo(2.2.1)hepta-2,5-diene wherein any substituents present are hydrocarbyl substituents having from 1 to 10 carbon atoms and having no non-aromatic unsaturation. One class of such bicycloheptadienes is represented by the formula

wherein R has the previously stated significance and m represents the number of R substituents and m is a whole number from 0 to 4, preferably from 0 to 2. These reactants are conveniently prepared by condensation of appropriately substituted or unsubstituted cyclopentadienes and acetylenes, for example, by the method described in U.S. 2,875,256 issued February 24, 1959, to Hyman et al. Best results are obtained, however, when the bicycloheptadiene reactant possesses no ring substituents, and in the preferred modification of the process of the invention, bicyclo(2.2.1)hepta-2,5 - diene is employed as the reactant.

The ethylenic reactant possesses a single ethylenic linkage, i.e., a non-aromatic carbon-carbon double bond, which is activated by the presence as a substituent on one carbon atom of the double bond of an electron withdrawing group. By electron withdrawing group is meant a substituent group, which when attached to an aromatic ring is thought to be meta-directing and ring deactivating. Exemplary electron withdrawing groups includes cyano, formyl, carboalkoxy, acyl, carbamyl, sulfonyl, sulfo, nitro and the like. Although the ethylenic reactant may have an additional substituent upon the carbon atom to which the electron withdrawing group is attached, it is preferred that the remaining carbon atom of the ethylenic linkage have only hydrogen substituents. A preferred class of such ethylenic reactants is represented by the formula $$CH_2=C-A$$
$$\quad\;\;|$$
$$\quad\;\;R'$$

wherein R' is hydrogen or alkyl, preferably straight-chain alkyl, having from 1 to 4 carbon atoms, preferably 1, and A is cyano, carboalkoxy wherein the alkyl moiety has from 1 to 8 carbon atoms, preferably from 1 to 4, formyl, carbonylalkyl wherein the alkyl moiety has from 1 to 8 carbon atoms, preferably 1 to 4, or N,N-di-R'-carbamyl. From considerations of ease of reaction, preferred as the R' substituent is hydrogen.

Illustrative of the preferred class of ethylenic reactants are acrylonitrile, methacrylonitrile, methyl acrylate, butyl methacrylate, propyl ethacrylate, methyl methacrylate, ethyl acrylate, butyl α-propylacrylate, acrolein, methacrolein, ethacrolein, methyl vinyl ketone, ethyl α-methylvinyl ketone, butyl α-ethylvinyl ketone, acrylamide, N,N-dimethylacrylamide, ethacrylamide and N-butylacrylamide.

The process of the invention is conducted by mixing the catalyst and reactants and maintaining the reaction mixture at an elevated temperature until reaction is complete. The method of mixing it not critical. Although one reactant may be added to the other, as by adding the ethylenic reactant to the bicycloheptadiene continuously or in increments, it is equivalently useful to initially mix the entire amount of reactants. The reactants may be employed in any convenient ratio, although it is frequently useful to employ a slight excess of the ethylenic reactant in order to retard possible bicycloheptadiene dimerization. Molar ratios of bicycloheptadiene to ethylenic reactant from about 1.5:1 to about 1:4 are satisfactory, while ratios from about 1:1 to about 1:2 are preferred. The nickel complex is employed in catalytic amounts. Suitable amounts of catalyst vary from about 0.0001% mole to about 5% mole based on the limiting reactant, although amounts from about 0.001% mole to about 1% mole on the same basis are preferred.

The condensation process is conducted at elevated temperatures. Reaction temperatures from about 80° C. to about 300° C. are suitable, although best results are obtained when reaction temperatures from about 100° C. to about 225° C. are employed. The reaction is preferably conducted at pressures that are atmospheric or above and pressures from about 1 atmosphere to about 100 atmospheres are satisfactory. Advantageous use is frequently made of pressures generated when the reaction mixture is heated to reaction temperature in a sealed container. Such pressures typically vary from about 2 atmospheres to about 20 atmospheres.

It is occasionally desirable, although not required, to make some provision for inhibition of polymerization of the ethylenic reactant during the condensation process, such as by including in the reaction mixture a small amount of inhibitor. Conventional polymerization inhibitors capable of trapping free radicals formed during the reaction process are satisfactory, provided that the inhibitor is inert toward the catalyst, the unsaturated reactants and the products produced therefrom. Preferred inhibitors therefore contain no reactive hydrogen atoms. Illustrative of suitable inhibitors are the hindered phenols, i.e., phenols wherein the phenolic hydroxyl group is sterically hindered by the presence of branched alkyl substituents on each ring position ortho to the hydroxyl group. Typical hindered phenols include 2,6-di-tert-butyl-4-methylphenol, 2,4,6-tri-tert-butylphenol, 2,6-diisopropyl-4-methylphenol, 2,6-di-tert-butylphenol and the like. The inhibitor, if employed, is added in comparably small amounts. Amounts of inhibitor from about 0.001% mole to about 0.1% mole based upon the limiting reactant are preferred.

Subsequent to reaction, the products are separated and recovered by conventional methods such as by fractional distillation, selective extraction and crystallization.

The products of the process of the invention are 8-substituted quadricyclo(2.2.1.2$^{3,5}$.0$^{2,6}$)nonanes. When prepared from the preferred reactants, the products are represented by the formula below wherein the numbers indicate a conventional method for numbering such polycyclic compounds, and wherein A, R, $m$ and R' have the previously stated significance.

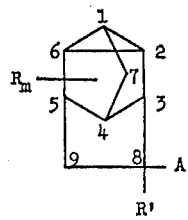

Typical of the products produced by the process of the invention are 8-cyanoquadricyclo(2.2.1.2$^{3,5}$.0$^{2,6}$)nonane,
8-cyano-8-methylquadricyclo(2.2.1.2$^{3,5}$.0$^{2,6}$)nonane,
8-formylquadricyclo(2.2.1.2$^{3,5}$.0$^{2,6}$)nonane,
8-carbethoxyquadricyclo(2.2.1.2$^{3,5}$.0$^{2,6}$)nonane,
8-acetylquadricyclo(2.2.1.2$^{3,5}$.0$^{2,6}$)nonane,
8-carbomethoxy-8-ethylquadricyclo(2.2.1.2$^{3,5}$.0$^{2,6}$)nonane,
8-butryl-8-methylquadricyclo(2.2.1.2$^{3,5}$.0$^{2,6}$)nonane, and
8-formyl-8-butylquadricyclo(2.2.1.2$^{3,5}$.0$^{2,6}$)nonane.

The products of the process of the invention are suitable for use as chemical intermediates. As the functional group A remains unaffected by the condensation process, a number of useful conventional derivatives, e.g., acids, esters, amines and the like, may be produced therefrom. In addition, the substituted quadricyclononanes are useful biocidal chemicals, particularly insecticides, and are additionally useful as high energy fuels.

To further illustrate the process of the invention, the following examples are provided. It should be understood that they are not to be regarded as limitations, as the teachings thereof may be varied as will be understood by one skilled in this art.

*Example I*

To a 1 liter autoclave were charged 180 g. of bicyclo-(2.2.1)hepta-2,5-diene, 160 g. of acrylonitrile, 0.5 g. of 2,6-di-tert-butyl-4-methylphenol inhibitor, and 2.3 g. of tetrakis[tri(2-ethylhexyl)phosphite]nickel(0). The reactants were heated under a nitrogen atmosphere to 165° C. whereupon the reaction became exothermic and the temperature rose to 176° C. before subsequently dropping back to 165° C. The reaction mixture was then maintained at 165–172° C. for an additional 3 hours. Distillation of 323 g. of the product mixture afforded 56.2 g. of recovered feed olefins, 244.9 g. of the product 8-cyanoquadricyclo(2.2.1.2$^{3,5}$.0$^{2,6}$)nonane, distilling at 127° C. at 20 mm., and 22.1 g. of higher boiling products. The refractive index of the product, $n_D^{20}$, varied from 1.5062 to 1.5075 during distillation, evidencing the presence of two principal isomeric products. A mass spectrum of the product showed the molecular weight to be 145, and the infrared and nuclear magnetic resonance spectra were consistent with a mixture of isomers of the above structure. The yield of quadricyclononane based on bicycloheptadiene converted was 94%.

*Analysis.*—Calc.: C, percent wt., 82.72; H, percent wt., 7.64; N, percent wt., 9.64. Found: C, percent wt., 82.6; H, percent wt., 7.7; N, percent wt., 9.4.

A similar experiment conducted in the absence of the nickel catalyst yielded little or no quadricyclononane.

*Example II*

The procedure of Example I was followed to react 0.15 mole of bicyclo(2.2.1)hepta-2,5-diene and 0.225 mole of acrylonitrile in the presence of 0.34 millimole of tetrakis[tri(p-tolyl)phosphite]nickel(0) as catalyst. The reaction mixture was maintained at 140–148° C. for 64 minutes. Analysis of the resulting product mixture showed a 99% conversion of the bicycloheptadiene and an approximately 96% selectivity for the formation of a mixture of two isomers of 8-cyanoquadricyclo-(2.2.1.2$^{3,5}$.0$^{2,6}$)nonane, present in a ratio of 4 to 1.

A similar experiment was conducted employing the same amounts of feed olefins, but 1.8 millimoles of tetrakis(trimethylphosphite)nickel(0) at catalyst. The reactants were maintained at 145–165° C. for 62 minutes. Product analysis showed a 50% conversion of the bicycloheptadiene with an approximately 95% selectivity for the formation of 8-cyanoquadricyclo(2.2.1.2$^{3,5}$.0$^{2,6}$)nonane. When the reaction was repeated employing 0.56 millimole of tetrakis(triisopropylphosphite)nickel(0) as catalyst and a reaction temperature of 130–140° C. for 70 minutes, the conversion of bicycloheptadiene was 98% and the selectivity for formation of the substituted quadricyclononane was approximately 95%.

*Example III*

To an autoclave were charged 10.6 g. of bicyclo(2.2.1)-hepta-2,5-diene, 9.7 g. of methyl vinyl ketone and 1.0 g. of tetrakis[tri(2-ethylhexyl)phosphite]nickel(0). The methyl vinyl ketone was of a commercial grade containing about 25% light boiling impurities. The reaction was heated under a nitrogen atmosphere to 128° C., at which temperature the reaction became exothermic and the temperature rose rapidly to 198° C. When the temperature had dropped to 147° C., heating was resumed and continued for 15 additional minutes. The product mixture was distilled and analyzed by gas-liquid chromatography. Essentially all of the methyl vinyl ketone had reacted, and 1.52 g. of bicycloheptadine were recovered. The product 8-acetylquadricyclo(2.2.1.2$^{3,5}$.0$^{2,6}$)nonane, B.P. 120–123° C. at 20 mm., was obtained in a 78% yield (12.9 g.) based on the methyl vinyl ketone. The mass spectrum showed the compound to have a molecular weight of 162, and the infrared and nuclear magnetic resonance spectra were consistent with a 2:1 ratio of isomers of the above formula.

*Analysis.*—Calc.: C, percent wt., 81.44; H, percent wt., 8.70. Found: C, percent wt., 81.89; H, percent wt., 8.72.

*Example IV*

To a 1 liter autoclave were charged 180 g. of bicyclo-(2.2.1)hepta-2,5-diene, 191 g. of methyl acrylate stabilized with 0.3 g. of 2,6-di-tert-butyl-4-methylphenol inhibitor and 1.25 g. of tetrakis[tri(2-ethylhexyl)phosphite]nickel(0). The autoclave was swept out with nitrogen and the reaction mixture was maintained at 167–169° C. for 4 hours. Distillation of a 333.6 g. portion of the product mixture afforded 93.6 g. of recovered feed, 119.6 g. of 8-carbomethoxyquadricyclo(2.2.1.2$^{3,5}$.0$^{2,6}$)-nonane, B.P. 120° C. at 20 mm., $n_D^{20}$ 1.4928–1.4932, and 115.9 g. of higher boiling products. Gas chromatography on a polar column and the nuclear magnetic resonance spectrum indicated the presence of two isomers. The mass spectrum showed the molecular weight of the product was 156, and the infrared and the nuclear magnetic resonance spectra were consistent with the above formula.

*Analysis.*—Calc.: C, percent wt., 74.13; H, percent wt., 7.92. Found: C, percent wt., 74.20; H, percent wt., 7.92.

*Example V*

The procedure of Example III was followed to react 14.7 g. of methacrylonitrile and 13.5 g. of bicyclo(2.2.1)-hepta-2,5-diene in the presence of 1.0 g. of tetrakis[tri(2-ethylhexyl)phosphite]nickel(0) at a temperature of 160° C. for 15 hours. Gas-liquid chromatographic analysis indicated the presence of 5.45 g. of 8-cyano-8-methyl-quadricyclo(2.2.1.2$^{3,5}$.0$^{2,6}$)nonane, present as a mixture of two isomers. The mass spectrum showed each isomer to have a molecular weight of 159, and the infrared and nuclear magnetic resonance spectra were consistent with the above formula. The principal isomer, 5.0 g., had a boiling point of 130° C. at 20 mm., and a refractive index, $n_D^{20}$, of 1.4930.

I claim as my invention:

1. The process for the production of the 8-substituted quadricyclo(2.2.1.2$^{3,5}$.0$^{2,6}$)nonane of the formula

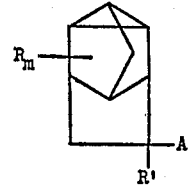

wherein R, m, R' and A are as defined below, by reacting the hydrocarbon bicyclo(2.2.1)hepta-2,5-diene compound of the formula

wherein R is hydrocarbyl free from non-aromatic unsaturation of up to 10 carbon atoms and m is a whole number from 0 to 4, with the compound

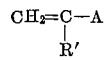

wherein R' is hydrogen or alkyl of up to 4 carbon atoms and A is cyano, carboalkoxy wherein the alkyl moiety has up to 8 carbon atoms, formyl, carbonylalkyl wherein the alkyl moiety has up to 8 carbon atoms or N,N-di-R'-carbamyl wherein R' is hydrogen or alkyl of up to 4 carbon atoms, in the presence of from about 0.0001% mole to about 5% mole based on the limiting reactant of the tetrakis(trihydrocarbylphosphite)nickel(0) catalyst of the formula

[P(OR)$_3$]$_4$Ni(0)

wherein R independently is hydrocarbyl free from non-aromatic unsaturation of up to 10 carbon atoms, at a temperature from about 80° C. to about 300° C. and a pressure from about 1 atmosphere to about 100 atmospheres.

2. The process of claim 1 wherein the bicycloheptadiene compound is bicyclo(2.2.1)hepta-2,5-diene.

3. The process of claim 2 wherein the trihydrocarbyl-phosphite is tri(2-ethylhexyl)phosphite.

4. The process of claim 2 wherein the trihydrocarbyl-phosphite is tri(p-tolyl)phosphite.

5. The process for the production of 8-substituted quadricyclo(2.2.1.2$^{3,5}$.0$^{2,6}$)nonane of the formula

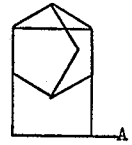

wherein A is as defined below, by reacting bicyclo(2.2.1)hepta-2,5-diene with the compound

CH$_2$=CH—A wherein A is cyano, carboalkoxy wherein the alkyl moiety has up to 8 carbon atoms, formyl, carbonylalkyl wherein the alkyl moiety has up to 8 carbon atoms, and carbamyl, in the presence of from about 0.0001% mole to about 5% mole based on the limiting reactant of the tetrakis-(trihydrocarbylphosphite)nickel(0) catalyst of the formula

[P(OR)$_3$]$_4$Ni(0)

wherein R independently is hydrocarbyl free from non-aromatic unsaturation, at a temperature from about 80° C. to about 300° C. and a pressure from about 1 atmosphere to about 100 atmospheres.

6. The process of claim 5 wherein the trihydrocarbylphosphite is trialkylphosphite.

7. The process of claim 6 wherein the trialkylphosphite is triisopropylphosphite.

8. The process of claim 6 wherein the trialkylphosphite is tri(2-ethylhexyl)phosphite.

9. The process of claim 6 wherein A is cyano.

10. The process of claim 6 wherein A is carboalkoxy wherein the alkyl moiety has from 1 to 8 carbon atoms.

11. The process of claim 6 wherein A is carbonylalkyl wherein the alkyl moiety has from 1 to 8 carbon atoms.

No references cited.

CHARLES B. PARKER, *Primary Examiner.*

JOSEPH P. BRUST, *Examiner.*